Aug. 26, 1924.
A. N. MALLER ET AL
VEHICLE TRAFFIC SIGNAL
Filed April 8, 1922     3 Sheets-Sheet 2
1,506,597
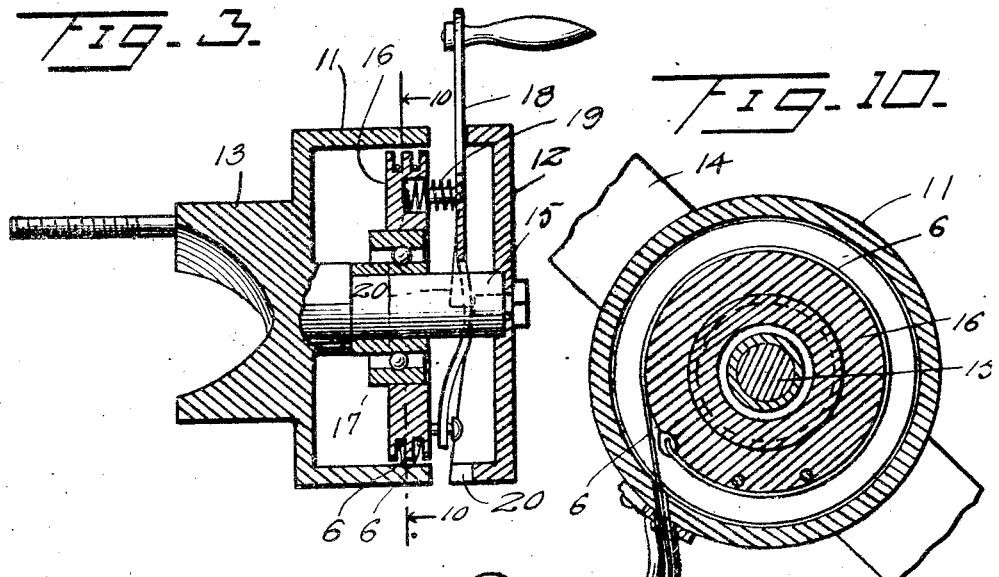
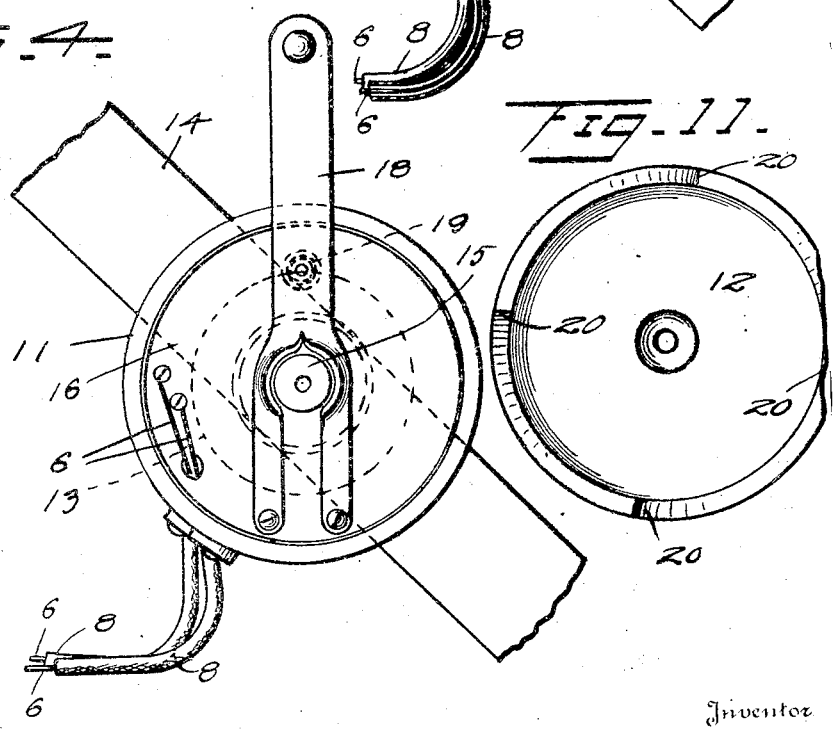
Inventor
A. N. Maller, R. J. Maller,
N. J. Maller.
By
[signature], Attorney Aug. 26, 1924.  
A. N. MALLER ET AL  
VEHICLE TRAFFIC SIGNAL  
Filed April 8, 1922     3 Sheets-Sheet 3
1,506,597
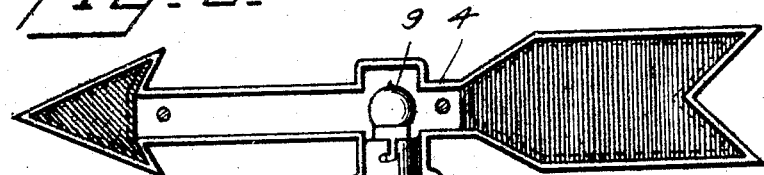
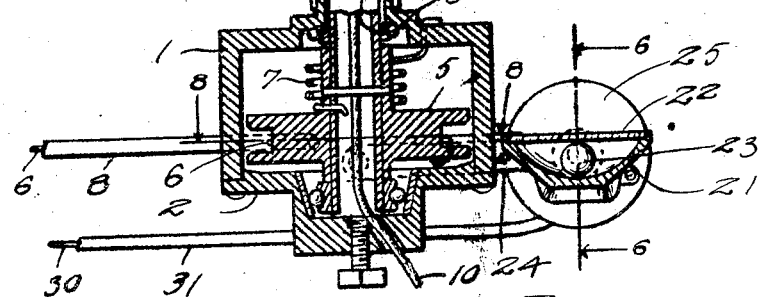
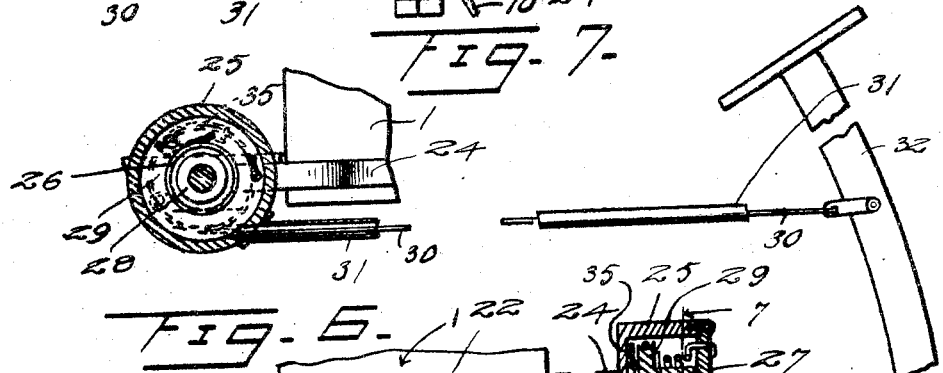
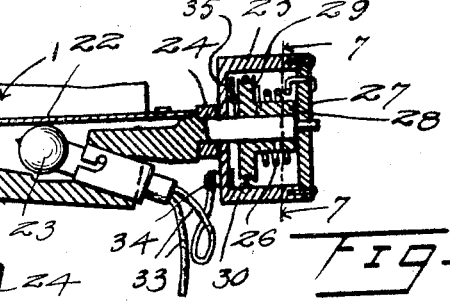
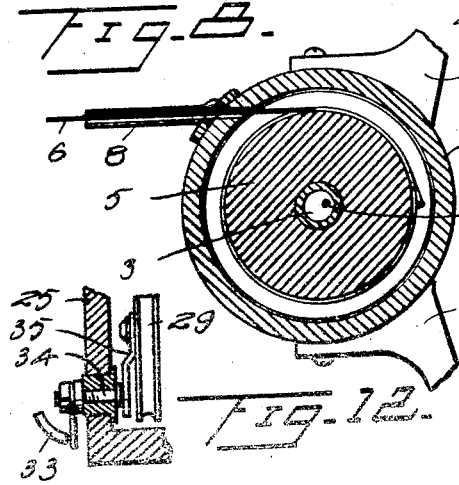
Inventor  
A.N.Maller, R.J.Maller,  
N.J.Maller.  
By  
Attorney Patented Aug. 26, 1924.

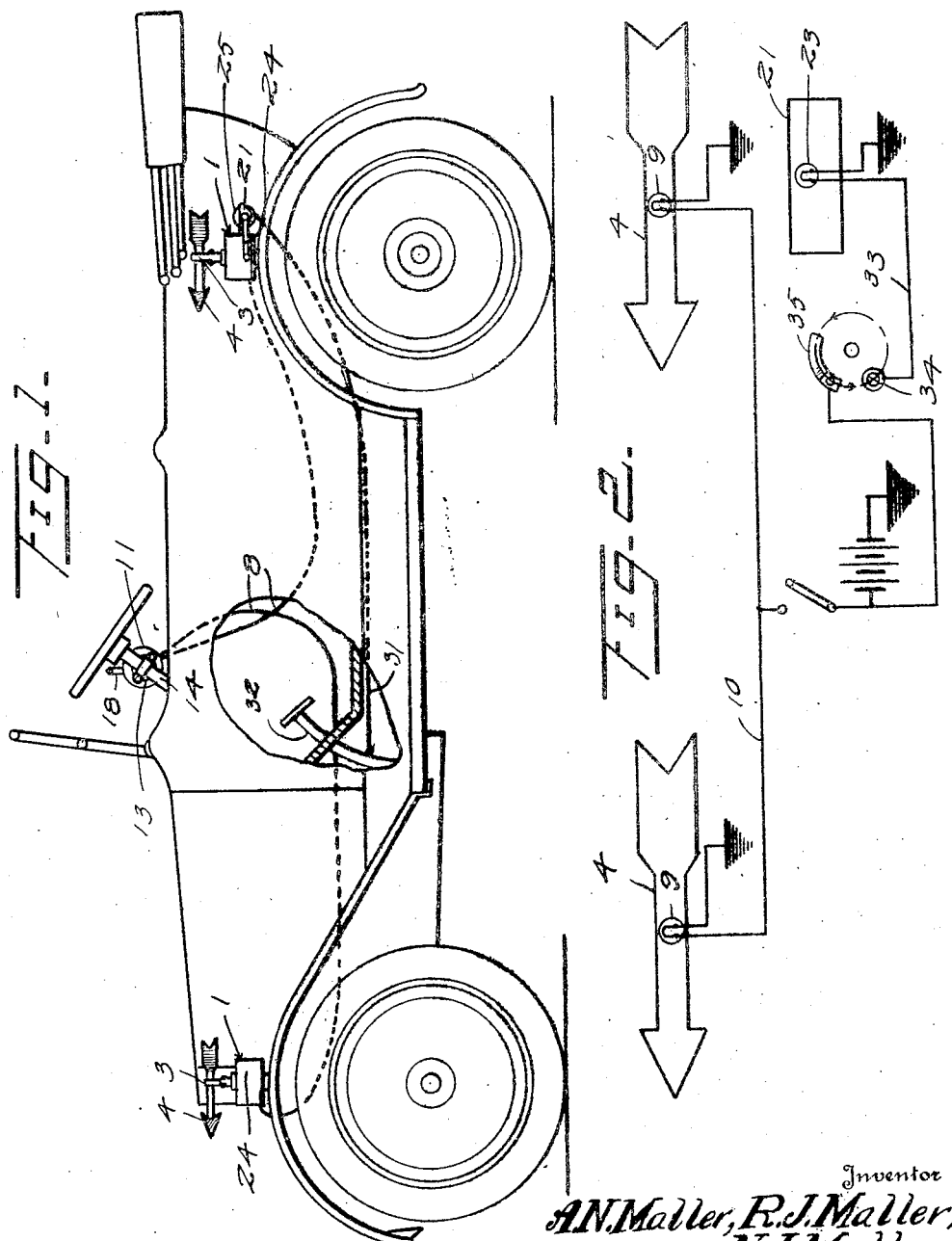

1,506,597

UNITED STATES PATENT OFFICE.

ALOYS N. MALLER, RAYMOND J. MALLER, AND NORBERT J. MALLER, OF OELWEIN, IOWA; SAID RAYMOND J. MALLER AND NORBERT J. MALLER ASSIGNORS TO SAID ALOYS N. MALLER.

VEHICLE TRAFFIC SIGNAL.

Application filed April 8, 1922. Serial No. 550,664.

*To all whom it may concern:*

Be it known that we, ALOYS N. MALLER, RAYMOND J. MALLER, and NORBERT J. MALLER, citizens of the United States, residing at Oelwein, in the county of Fayette and State of Iowa, have invented certain new and useful Improvements in Vehicle Traffic Signals; and we do hereby declare the following to be a full, clear, and exact description of the invention, such as will enable others skilled in the art to which it appertains to make and use the same.

This invention has relation to signaling means designed chiefly for motor vehicles, whereby to apprise pedestrians and drivers of other vehicles of the intention of a driver when about to make a turn either to the right or left, or to bring the vehicle to a standstill, whereby to obviate a casualty.

The invention contemplates direction signal means disposed both at the front and the rear of the vehicle and a stop signal located wholly in the rear and operable when the brake is applied, whereby to warn drivers of following vehicles of the intention of the driver ahead to bring the vehicle to a stop, thereby avoiding a rear end collision.

The front and rear direction signals are connected for simultaneous operation, whereas the stop signal has an independent control and is preferably connected with the brake pedal of the vehicle so that when the brakes are applied to stop the vehicle, the stop signal is at the same time operated to give proper warning to the driver of a vehicle in the rear.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of an automobile provided with signaling means embodying the invention, Figure 2 is a diagrammatic view of the electrical circuits, Figure 3 is a section of the direction control applied to the steering column, Figure 4 is a front view of the direction control with the cap or cover omitted, Figure 5 is a sectional view of the combined direction and stop signals, showing the parts on a larger scale, Figure 6 is a detail section on the line 6—6 of Figure 5, Figure 7 is a sectional detail on the line 7—7 of Figure 6, Figure 8 is a horizontal section on the line 8—8 of Figure 5, Figure 9 is a front view of the plate closing the casing of the stop signal, Figure 10 is a sectional detail on the line 10—10 of Figure 3, Figure 11 is a view of the cap associated with the direction control as seen from the inner side, and Figure 12 is a detail view of portion of the stop signal showing the lamp circuit closed.

Corresponding and like parts are referred to in the following description and designated in the several views of the drawings by like reference characters.

The signaling means are shown applied to a motor vehicle of the automobile type and are disposed upon the front and rear fenders upon the left hand side of the machine, the control for the direction signals being applied to the steering column and the stop signal having connection with the brake pedal to be operated thereby. The direction signals applied to the front and rear fenders are substantially the same, hence a detail description will suffice for a clear understanding of each. The stop signal is preferably combined with the rear direction signal and is attached to the casing thereof, whereby to obviate the use of extra fastening means for attaching it directly to the vehicle. The several signals are connected to the operating or control means by wires and these wires are enclosed in tubes which protect and direct the same.

Each direction signal includes a casing 1 embodying a circular wall and a closing end, one end of the casing being open to admit of ready access thereto and said open end being closed by means of a cap or cover 2 which is made fast in any preferred way. A hollow shaft 3 is mounted within the casing 1 and projects beyond the closed end thereof to receive an arrow 4 or like indicator. A wheel 5 fast to the shaft 3 so as to rotate therewith, is grooved in its outer edge to receive a wire 6 which constitutes the connecting means between the control and the signal. A spiral or helical spring 7 is mounted on the shaft 3 and one end thereof is connected to the shaft and the opposite end to the casing 1. This spring 7 is normally under tension to maintain the shaft 3 in normal or predetermined position. The wire 6 passes laterally through an opening formed in the outer wall of the casing 1 and passes through a tube 8 which is secured at one end to the casing 1 and which extends to the control whereby to protect and form a guide for the operating wire 6.

The arrow 4 or indicator is preferably hollow and may be constructed wholly or in part of glass or other transparent material. The tip or head of the arrow is green, whereas the rear or tail is red. An electric lamp 9 is disposed within the arrow 4 and serves to illuminate the ends thereof to render the same visible after dark. The lamp 9 is included in a circuit containing a wire 10 which extends through the shaft 3.

The control means for the direction signals comprises a casing 11 which is similar in construction to the casing 1, since it comprises a circular wall, a fixed closing end and a removable cap or cover 12. A clamp 13 forms part of the casing 11 and provides means for attaching said casing to the steering column 14 of the vehicle. An axle 15 is disposed centrally within the casing 11 and supports a pulley 16 which is grooved in its periphery to receive the wires 6 from the front and rear direction signals. Antifriction or ball bearings 17 are interposed between the pulley 16 and axle 15 to admit of the pulley rotating with a minimum amount of friction. A lever 18 is connected at one end to the pulley 16 and is rotatable therewith, and its outer end is adapted to move laterally and is pressed outwardly by means of an expansible helical spring 19 interposed between it and the pulley 16, whereby to insure positive engagement of the lever 18 with one of a plurality of teeth 20 upon the inner side of the cap or cover 12 which is secured fixedly to the axle 15. The inner end of the lever 18 is forked and the axle 15 passes between the fork members and the latter are attached to the pulley 16. When the arrow 4 or indicating member points straight ahead, the lever 18 is down and in line with the steering column. In this position the lever is nearly at the limit of its movement in one direction, lacking but one tooth. Movement of the lever 18 forward or in a clockwise direction results in winding of the operating wires 6 on the pulley 16 and the unwinding of said wires from the respective wheels 5, the latter being turned against the tension of the spiral springs 7. When the arrows 4 have been moved to the required position, the lever 18 is permitted to engage with one of the teeth 20, whereby to hold the direction signals in the set or adjusted position. When the lever 18 is disengaged from the teeth 20, it and the arrows 4 return to normal position by the action of the springs 7, as will be readily understood. By proper manipulation of the lever 18, the direction signals may be set to indicate the intention of the driver to turn either to the right or left, or to back, turn around, thereby giving ample warning both to drivers and pedestrians so as to avoid a casualty.

The stop signal comprises an oblong casing 21 which is open at the front and receives a plate 22 upon which appears the word "Stop" or other legend. A lamp 23 is disposed within the casing 21 so as to illuminate the plate 22 and display the word carried thereby. The casing 21 is disposed transversely and is mounted in brackets 24 attached to the casing 1 of the rear direction signal. A circular casing 25 attached to or forming a part of one of the brackets 24, receives and houses a spring 26 which is of spiral or helical form. The outer side of the casing 25 is closed by means of a cover 27. One end of the spring 26 is attached to the cover 27 and its opposite end is attached to a hub 28 of a disk 29 secured to a journal of the casing 21. The spring 26 normally holds the casing 21 in position with the plate 22 facing in a direction so as not to be visible from the rear of the vehicle. In the present instance, the plate 22 faces upwardly and is brought into vertical position when the control of the stop signal is operated. An operating wire 30 passes through an opening formed in a side of the casing 25 and engages a groove in the edge of the disk 29 and is partly wound upon the latter. The wire 30 passes through a guide tube 31 leading from the casing 25. The operating wire 30 is attached to the brake pedal 32 or like part, and when said brake pedal or like part is operated, the wire 30 is drawn upon and unwound from the disk 29, thereby turning said disk and the casing 21 and bringing the front of the latter into vertical position so that the stop signal may be observed from the rear of the vehicle, thereby giving warning that it is the intention of the driver to bring the vehicle to a standstill.

It is to be understood that the light circuits including the lamps of the stop and direction signals may include switches which are adapted to be conveniently disposed for operation when required. It is also observed that the arrows by reason of their construction may be used as parking lamps. The relative positions of the signals is unimportant as they may be located in any convenient and advantageous position.

The lamp 23 is included in a circuit embodying a wire 33. A fixed contact 34 insulated from the casing 25 and carried thereby coacts with a contact 35 carried by the disk 29. When the stop signal is in normal position, as indicated in Figure 5, the lamp circuit 23 is broken. When the casing 21 is turned to display the stop signal the lamp circuit 23 is closed and illuminates the signal to render the same visible.

The pulley 16 is formed with a groove in its periphery for each of the wires 6 or like connection. The ends of the wires 6 extend laterally through a side of the pulley 16 and are attached thereto, Figure 4.

What is claimed is:

1. In a signalling mechanism, a casing having spaced sections, an axle extending from one of the sections, the other section being fastened to the axle, a pulley journaled on the axle, means trained about the pulley for actuation to operate signal means, an arm bifurcated to straddle said axle and secured to the pulley, said arm being movable intermediate the sections, one of the sections having teeth engageable by said arms, said pulley having a recess, the arm having a projection adapted to enter said recess when it is disengaged from said teeth, and a spring anchored in said recess and projecting therefrom and normally urging said member into engagement with said teeth.

2. In a signalling mechanism, a casing having spaced sections, an axle extending from one of the sections, the other section being fastened to the axle, a pulley journaled on the axle, draw means associated with the pulley and adapted to actuate a signal, an arm secured to the pulley and adapted to be moved about the axle to rotate said pulley, said arm movable intermediate the sections, one of the sections having teeth engageable by said arm, said pulley having a recess on the opposite side of the axle from that at which the arm is secured, the arm having a projection to enter said recess when the arm is disengaged from said teeth, and a spring normally urging said arm into engagement with said teeth.

In testimony whereof we affix our signatures in presence of two witnesses.

ALOYS N. MALLER.
RAYMOND J. MALLER.
NORBERT J. MALLER.

Witnesses:
 CARL BASHBY,
 NOBLE ROBINSON.